United States Patent [19]

Bailey et al.

[11] 3,879,716

[45] Apr. 22, 1975

[54] MUTUALLY EXCLUSIVE MAGNETIC BUBBLE PROPAGATION CIRCUITS WITH DISCRETE ELEMENTS

[75] Inventors: Paul T. Bailey, Creve Coeur, Mo.; L. John Doerr, III, Houston, Tex.

[73] Assignee: Monsanto Company, St. Louis, Mo.

[22] Filed: Mar. 6, 1974

[21] Appl. No.: 448,649

[52] U.S. Cl. .............................................. 340/174 TF
[51] Int. Cl. .............................................. G11c 11/14
[58] Field of Search .............................. 340/174 TF

[56] References Cited

UNITED STATES PATENTS

| | | | |
|---|---|---|---|
| 3,689,751 | 9/1972 | Chow | 340/174 TF |
| 3,702,991 | 11/1972 | Bate et al. | 340/174 TF |
| 3,772,661 | 11/1973 | Oshima et al. | 340/174 TF |
| 3,778,789 | 12/1973 | Watanabe et al. | 340/174 TF |

OTHER PUBLICATIONS

IBM Technical Disclosure Bulletin, Vol. 13, No. 11, Apr. 1971, pg. 3294.

*Primary Examiner*—James W. Moffitt
*Attorney, Agent, or Firm*—Lane, Aitken, Dunner & Ziems

[57] ABSTRACT

A magnetic bubble overlay circuit element, nicknamed the "crow-foot" element, has a straight bar or stem portion with a pair of angled arms in the form of staggered barb-like projections. One of the arms extends from one end of the stem, and the other arm is located intermediate of the ends of the stem on the other side thereof. The overlay pattern is driven by pulsed in-plane drive fields or a uniformly rotating drive field realigning with the elements' straight portions such that attracting poles are formed consecutively along the stem portion of each element. Bubbles are propagated in channels composed of serially arranged similar crow-foot elements having aligned stems. Mutually exclusive closed loop crow-foot circuits propagate bubbles only in the presence of exclusively corresponding sets of drive field pulses.

31 Claims, 9 Drawing Figures

MUTUALLY EXCLUSIVE MAGNETIC BUBBLE PROPAGATION CIRCUITS WITH DISCRETE ELEMENTS

BACKGROUND OF THE INVENTION

The invention relates generally to the field of magnetic bubble technology (MBT) and, more particularly, to means for propagating or transmitting magnetic bubbles.

Briefly, MBT involves the creation and manipulation of magnetic bubbles in specially prepared magnetic materials. The word "bubble" used throughout this text is intended to encompass any single-walled magnetic domain, defined as a domain having an outer boundary which closes on itself. The application of a static, uniform magnetic bias field orthogonal to a sheet of magnetic material having suitable uniaxial anisotropy causes the normally random serpentine pattern of magnetic domains to shrink into short cylindrical configurations or bubbles whose common polarity is opposite that of the bias field. The bubbles repell each other and can be moved or propagated by a magnetic field in the plane of the sheet.

Many schemes exist for propagating bubbles along predetermined channels. These techniques can be classed generally as conductor-accessed and field-accessed. In conductor-accessed propagation systems, loops of electrical conductors are disposed in series over the magnetic sheet. A propagation system has been proposed using a single conductor crisscrossing a permalloy rail defining bi-level bubble positions. In field-accessed propagation systems electrical conductors are not disposed on the magnetic sheet for propagation; instead, an overlay pattern of ferromagnetic elements defines a bubble propagation channel in which a sequence of attracting poles is caused to be formed in the presence of a continuous, uniformly rotating magnetic drive field in the plane of the sheet. A major distinction between conductor-accessed and field-accessed circuits is that several conductor-accessed circuits can be disposed on the same sheet or "bubble chip" and operated completely separately and exclusively from each other, while field-accessed circuits on the same chip all operate at the same time under the control of an ubiquitous, uniformly rotating, common drive field.

One attempt at providing field-accessed circuit selection in the prior art is shown in U.S. Pat. No. 3,543,252 to Perneski illustrating several variations on the familiar T-bar circuit to which corresponding permutations of pulsed orthogonal drive fields are applied.

MBT can be used in data processing because bubbles can be propagated through channels, whether field-accessed or conductor-accessed, at a precisely determined rate so that uniform data streams of bubbles are possible in which the presence or absence of a bubble at a particular position within the stream indicates a binary "1" or "0". Because of its potential for low cost, low power consumption and extremely high bit density, MBT is under active consideration for use in large scale memories of moderate speed. One of the prime design elements of many memory systems utilizing field-accessed magnetic bubbles is the provision of a closed loop bubble path which can be used as a recirculating "shift register." Many memory arrangements of this type employ a plurality of "minor" loops selectively interconnectible with a "major" loop such that bubbles can be transferred between the major and minor loops on command. The ability to propagate bubbles in one recirculating loop without operating other loops on the same chip has until recently been confined to systems employing conductor-accessed circuits.

The copending application, Ser. No. 432,450, filed Jan. 11, 1974, entitled "Mutually Exclusive Magnetic Bubble Propagation Circuits" by Howard H. Aitken, Paul T. Bailey and Robert C. Minnick, assigned to the assignee of this application, and incorporated by reference herein, discloses closed loop zigzag circuits mutually exclusively accessed by means of two different sets of repeating sequences of discrete, pulsed drive field orientations. The overlay pattern disclosed in the copending application is continuous. Corresponding sections of mutually exclusive closed loop circuits, as well as their respective drive fields are offset from each other by an optimum angle of about 30°.

SUMMARY OF THE INVENTION

One of the objects of the invention is to provide closed loop bubble propagation channels of discrete (noncontinuous) circuit elements, field-accessed by means of discretely oriented, pulsed fields. Another object of the invention is to provide mutually exclusive, closed loop circuits of discrete circuit elements, field-accessed by means of different sets of pulsed field orientations. A further object of the invention is to provide an improved discrete circuit element responsive to pulsed drive fields.

The applicants have discovered that these and other objects of the invention can be accomplished with a magnetic bubble overlay circuit element having a straight bar or stem portion with a pair of angled arms in the form of staggered barb-like projections. One of the arms extends from one end of the stem, and the other arm is located intermediate of the ends of the stem, such that the resulting configuration resembles a barbed hook. The elements are arranged in series with their stems in alignment to form a propagation path, resembling bird tracks, hence, the nickname "crow-foot" element. Bubbles are driven along the stem of each element by a sequence of three pulsed drive fields aligned respectively with the three portions of the element. Partial demagnetization of the nonaligned portions of the crow-foot element in the presence of a given drive field alignment tends to enhance the stability of bubble positions along the stem of each element. In the preferred embodiment, the drive fields are equally separated by approximately 120°, and therefore the arms of each element make 60° angles with the stem.

A closed loop path constructed of crow-foot elements is composed of at least three straight sides. The stems of elements making up different sides are parallel respectively to corresponding ones of the drive field orientations. Closed loop mutually exclusive crow-foot circuits can be composed by constructing one of the loops of reverse crow-foot elements relative to another loop. The respective drive fields which operate the exclusive circuits have complementary polarities such that one field sequence is the angular inverse of the other.

DESCRIPTION OF THE PREFERRED EMBODIMENTS

Figure 1:
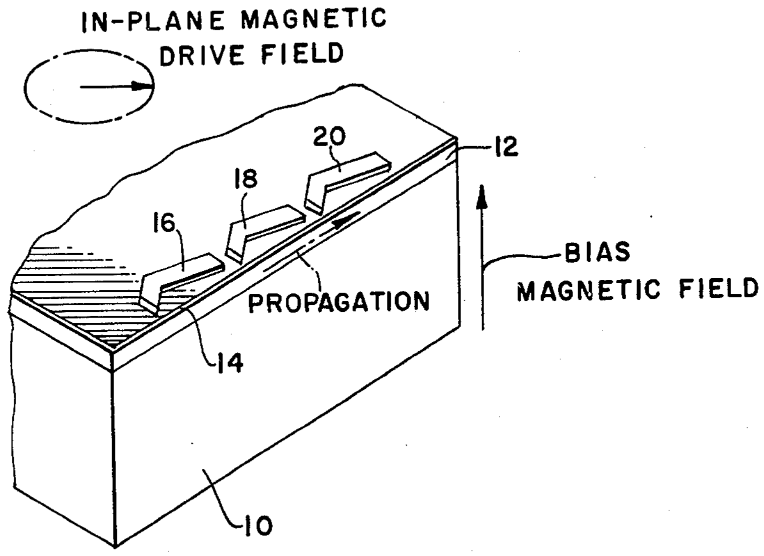
FIG. 1. (PRIOR ART)
FIG. 1 is a fragmentary perspective view of a bubble chip furnished with a conventional chevron circuit.

FIG. 1 illustrates the basic components of a field-accessed garnet bubble chip having a conventional chevron circuit. A substrate 10, of nonmagnetic garnet, supports an epitaxial magnetic bubble garnet layer 12 and spacing layer 14 of silicon oxide to which conventional permalloy chevron circuit elements 16, 18 and 20 are bonded. The chip is subjected to a static magnetic bias field orthogonal to the plane of the magnetic bubble garnet layer 12. In the presence of a bias field of strength, cylindrical magnetic bubbles (not shown in FIG. 1) are maintained in the bubble garnet layer 12. Conventionally, a rotating, in-plane magnetic drive field, produced by an orthogonal pair of Helmholtz coils, causes bubbles to propagate along chevron circuit element 16 to element 18, for example.

Many parameters affect the performance of chevron circuits, such as the number of parallel, stacked chevrons per bubble position (single chevrons are illustrated in FIG. 1), the spacing of adjacent chevrons, their width, the magnetic properties of the overlay material, the propagation rate, and the strengths of the bias and drive fields.

If one were concerned only with finding the best field-accessed overlay pattern for use with a uniformly rotating drive field, among those presently available, certainly either chevrons or T-bars would be a good choice. Another kind of circuit element, however, has been discovered to be more particularly suited to the task of circuit discrimination via different pulsed drive field orientations.

Figure 2:
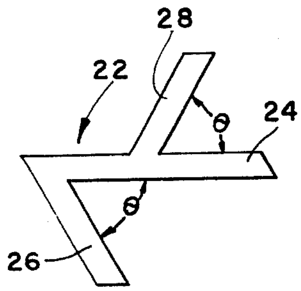
FIG. 2 is a plan view of a single crow-foot circuit element according to the invention.

The new circuit element, the crow-foot element 22 in FIG. 2, comprises a straight bar portion or stem 24 having an arm 26 at one end making an acute angle $\theta$ with the stem 24 and another arm 28, intermediate of the ends of the stem, extending on the other side thereof and making an acute angle $\theta$ therewith. Like staggered barbs on a spear, the arms 26 and 28 point in the same direction along the stem 24 (leftward as viewed in FIG. 2). Although the angles $\theta$ which the arms make with the stem may each be different, in the preferred embodiment these angles are both 60°. The crow-foot element 22 may be made of the same type of material as conventional circuit elements, e.g. permalloy, and would be affixed to the spacing layer 14 (see FIG. 1) in the same manner as conventional chevron or T-bar circuits.

Figure 3:
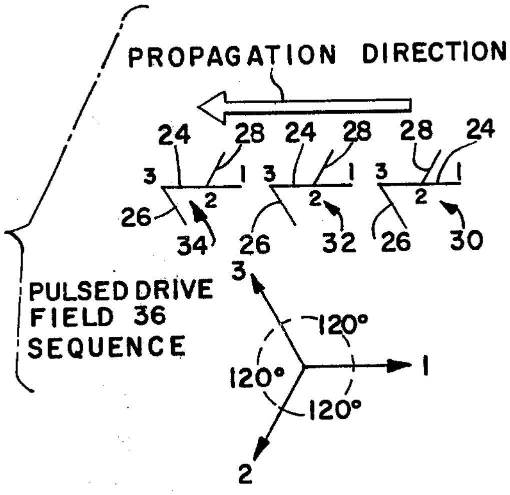
FIG. 3 is a schematic diagram illustrating a crow-foot circuit and its corresponding drive field sequence.

In FIG. 3 a crow-foot circuit comprising three serially arranged elements 30, 32 and 34 propagate bubbles to the left in the presence of a repeating sequence 36 of discrete, pulsed drive field orientations. The drive field orientations are labeled 1, 2 and 3 for reference and are aligned respectively with the portions of each crow-foot element. The first field orientation is parallel to the stem 24 and points away from the end which has the arm 26. The second field orientation points along the intermediate arm 28 toward its junction with the stem 24. The third and last field orientation points along the other arm 26 toward its junction with the end of the stem 24. As explained in greater detail below with FIG. 5, a given field orientation causes an attracting pole to be formed at one end of the aligned portion of each crow-foot element. Thus when field orientation number 1 is pulsed, each stem 24 forms an attracting pole at the position labeled 1 along the elements 30, 32 and 34. The bubble positions corresponding to the other drive fields are similarly labeled 2 and 3.

Figure 4:
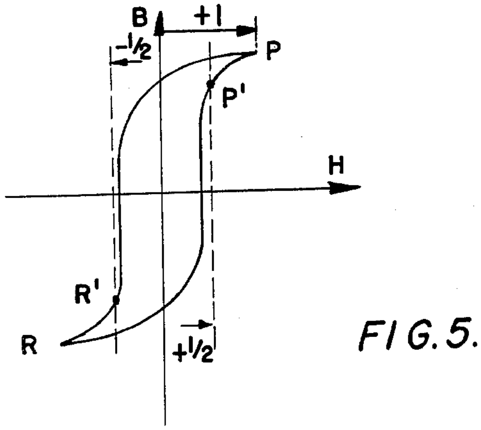
FIG. 4 is a graph approximating the typical hysteresis loop for an overlay material.
Figure 5:
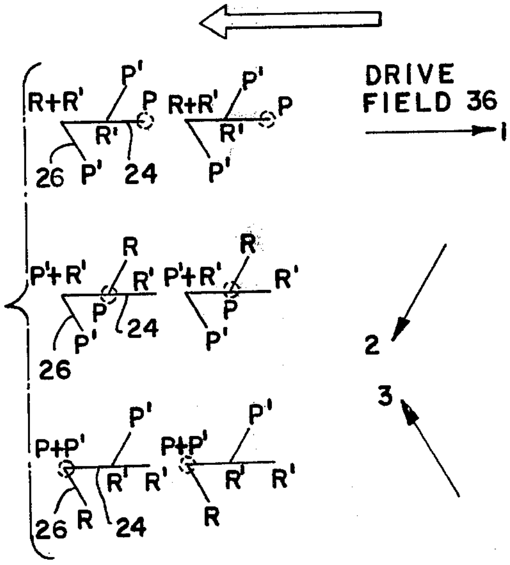
FIG. 5 illustrates three consecutive bubble positions and the corresponding magnetic conditions of the straight segments of each crow-foot element.

FIG. 4 is a hysteresis curve of a typical overlay material such as permalloy. In the graph the vertical axis represents magnetic flux, B, and the horizontal axis represents magnetic field intensity, H. In FIG. 5 consecutive field orientations and bubble positions 1, 2 and 3 are indicated for the same circuit elements in chronological order. The bubbles themselves are indicated in phantom. The first drive field orientation points to the right along the stems 24. In FIG. 4 the full field strength with which the stems are aligned is represented as one unit of H. Because the cosign of 60° is one-half, the arms 26 and 28 each experience one-half unit field strength as the vectorial projection of the drive field orientation number 1. While the full unit field strength is, according to design, sufficient to saturate the aligned element (that is to produce the maximum amount of magnetic flux), one-half field strength along the arm 28 is sufficient only to weakly magnetize this portion of the element. In order to distinguish graphically these states of magnetization, the opposing magnetic pole strengths produced at saturation are represented as P and R, and the poles produced at less than saturation by half field strengths are represented as P′ and R′. Thus, the poles produced along the stem 24 in the presence of drive field number 1 are P and R respectively and the poles produced along the angled arms 26 and 28 are both P′ and R′ respectively, the R′, or weakly repulsive pole, being located at the intersections of the arms with the stem 24. The combined effect at the left end of the stem 24 and the arm 26 is a fully repulsive pole plus a weakly repulsive pole, indicated by R + R′. In this magnetic condition, the right end of the element is fully attractive, the left end is extremely repulsive and the intermediate portion of the element is weakly repulsive. Thus the stability of the bubble position at the right end of each element in step 1 is enhanced beyond the degree of stability attributable to the stem alone.

Drive field number 2 is aligned with the arm 28 which forms poles P and R at opposite ends. Half field strengths are also produced along the stem 24 and the other arm 26. The weakly attracting pole at the left end of the stem 24 is due to the stem 24, and the weakly repulsive pole is due to the arm 26. The effects of the two magnetic contributions approximately cancel each other. The resulting magnetic configuration along each crow-foot element is a neutral left end, a fully attractive middle and a weakly repulsive right end. The weakly repulsive right end tends to aid the bubble in moving from the first to the second bubble position in the middle of each element.

Drive field number 3 is aligned with the arm 26. Because of the contribution of the stem 24 due to the half field projection, the left end of the crow-foot element becomes extremely attractive while the middle and right end of the element are weakly repulsive. The weakly repulsive right portion of each element, as well as the "pole and a half," present at the left end, tends to enhance bubble movement from the second to the third bubble position.

Accordingly, all of the bubble positions 1, 2 and 3 are stable and bubble motion along the stem of each element is positively enhanced by reason of the half field contributions. In order to insure transition of the bubble from one element to the next, that is from position 3 to position 1, the gap between adjacent ends of each crow-foot element should be extremely narrow in relation to the length of the stem 24. In fact, the width of this gap can determine whether the bubble jumps from one element to the next or chooses instead to traverse the entire length of the stem 24 in the reverse direction. The unwillingness of bubbles to leave a low energy position under a permalloy overlay to traverse a gap has been noticed before. One way to reduce the influence of the permalloy in this respect, however, is to increase the thickness of the spacing layer (layer 14, FIG. 1) between the garnet bubble material and the overlay.

Figures 6, 7:
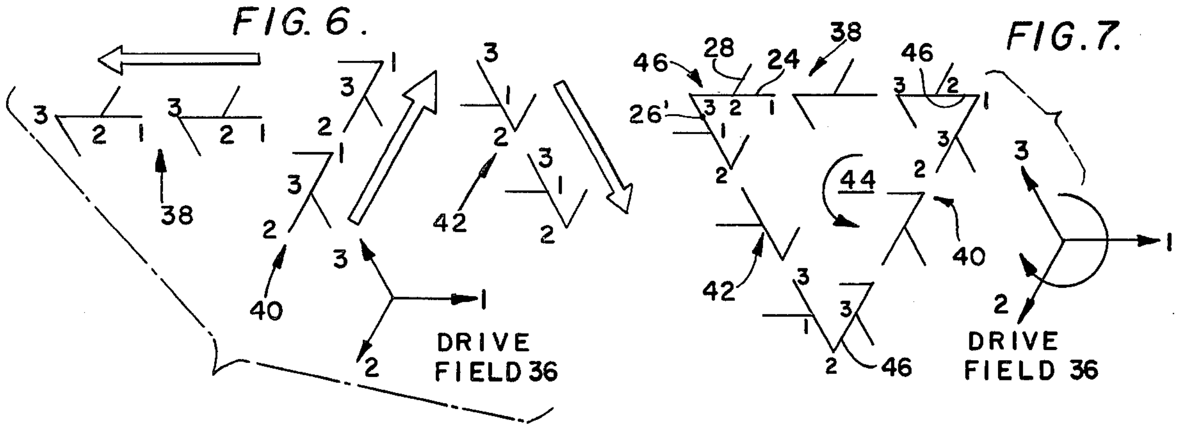
FIG. 6 is a schematic diagram illustrating three commonly driven crow-foot channels propagating in three different directions.
FIG. 7 is a schematic diagram illustrating a single closed loop crow-foot circuit.

FIG. 6 illustrates three different crow-foot circuits 38, 40 and 42 for propagating bubbles in three different directions corresponding to the directions of the standard drive field 36. The circuit 38 propagates bubbles to the left, opposite to the orientation of drive field number 1, as in the channel of FIG. 3. The circuit 40 propagates bubbles under the control of pulsed drive field 36 in a direction opposite to drive field number 2. Similarly, the circuit 42 propagates bubbles in a direction opposite to drive field number 3. The bubble positions along circuits 38, 40 and 42 are labeled 1, 2 and 3 corresponding to the numbered orientations of the drive field sequence 36.

The same drive field in FIG. 6 is capable of driving all three circuits, 38, 40 and 42 at once. If these circuits are joined together by means of special cornering elements, a closed path can be formed. The triangular circuit 44 shown in FIG. 7 recirculates bubbles under the control of drive field 36. The three straight sides of the closed loop circuit 44 correspond to the individual circuits 38, 40 and 42 of FIG. 6 as indicated in FIG. 7. The direction of propagation around the circuit 44 will be in the opposite direction from the "rotational" order in which the pulsed drive fields occur. For the drive field sequence 36, the rotational order of the fields is clockwise and the direction of propagation around the circuit 44 is counter-clockwise. If the drive fields were pulsed in the reverse order, that is, 3, 2, and 1, the direction of propagation around the circuit 44 would be clockwise. The circuit 44 has three cornering elements 46 each of which is a composite of two adjacent crow-foot elements on adjacent sides of the triangular path. Thus the arm 26 for the crow-foot element leading to the corner becomes the stem 24 for the next crow-foot element. Polygonal paths other than triangles can be composed of varying lengths and numbers of circuits 38, 40 and 42 in FIG. 6 using a suitable number of cornering elements 46. The space-saving technique disclosed in the afore-mentioned copending application can also be used with closed loop crow-foot circuits by designing complex zigzag paths of crow-foot elements in the nature of Peano diagrams.

Figure 8:
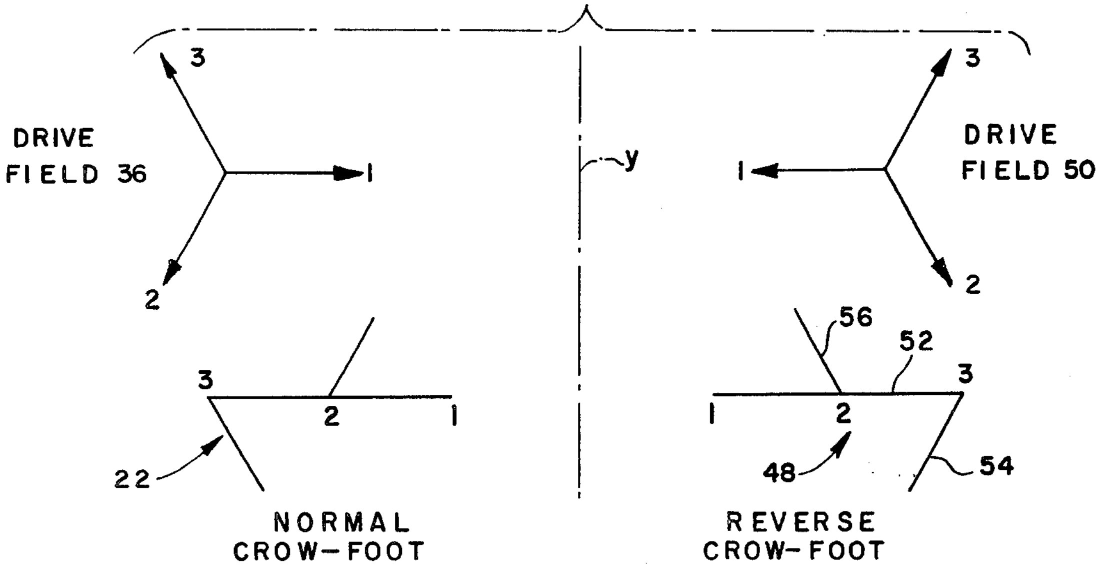
FIG. 8 is a schematic diagram illustrating two mutually exclusive crow-foot elements and their respective drive field sequences.

FIG. 8 illustrates a pair of mutually exclusive crow-foot elements 22 and 48 driven respectively by drive field sequences 36 and 50. Crow-foot element 22 is the same as the elements illustrated in FIGS. 2, 3, 5, 6 and 7. Crow-foot element 48 comprises a stem 52 with an end arm 54 and an intermediate arm 56. Thus element 50 is the reverse of the normal element 22 and represents its "mirror image" with respect to a vertical symmetry axis *y*. Drive field 50 is to element 48 as drive field 36 is to element 22. Thus drive field 50 contains three orientations which are opposite in direction from those in drive field 36. If the rotational order of drive fields 36 and 50 were the same (e.g. clockwise) the direction of propagation on elements 22 and 48, respectively would also be the same (e.g., leftward). As shown in FIG. 8, however, the fields and propagation directions are opposite.

Figure 9:
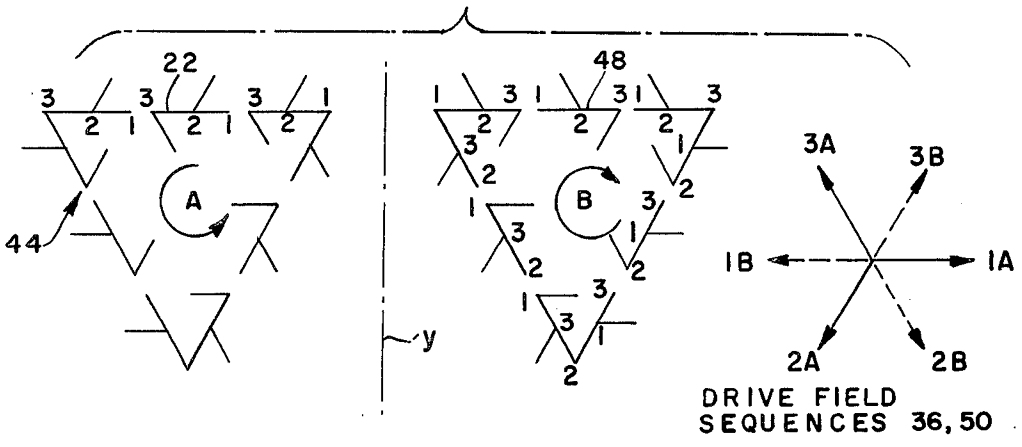
FIG. 9 is a schematic drawing illustrating two mutually exclusive closed loop crow-foot circuits and their respective drive field sequences.

FIG. 9 illustrates a pair of closed loop mutually exclusive circuits A and B. Circuit A is composed of normal elements 22 and corresponds to circuit 44 in FIG. 7. Circuit B is composed of the "reverse" crow-foot elements of FIG. 8 with appropriate cornering elements analogous to cornering elements 46 in FIG. 7. Drive fields 1A, 2A and 3A operate circuit A; drive fields 1B, 2B and 3B operate circuit B. The B fields are not effective to drive bubbles around circuit A; the A fields are not effective to drive bubbles around circuit B.

Although it is preferred to drive the crow-foot elements with discrete orientations of drive fields aligned with the respective straight segments of the element, it is also possible to drive the crow-foot elements with uniformly rotating fields. However, the mutually exclusive circuits illustrated in FIG. 9 cannot be exclusively selected using a uniformly rotating field rather than discrete pulses.

The invention may be embodied in other specific forms without departing from its spirit or central characteristics. The present embodiments are therefore to be considered in all respects as illustrative and not restrictive, the scope of the invention being indicated by the claims rather than by the foregoing description, and all changes which come within the meaning and range of equivalence of the claims are therefore intended to be embraced therein.

We claim:

1. A field-accessed bubble propagation system, comprising a sheet of magnetic bubble material, means for producing and maintaining bubbles therein, a ferromagnetic overlay circuit operatively disposed on said sheet including at least one discrete element having a straight stem portion with an angled arm projecting from one end thereof and making an acute angle with said stem portion and another angled arm projecting from the middle of said stem portion making an acute angle therewith on the other side thereof, and means for applying a magnetic drive field in the plane of said sheet to propagate bubbles along said stem portion.

2. The system of claim 1, wherein there is a plurality of discrete elements serially arranged with respective stem portions juxtaposed end-to-end.

3. The system of claim 1, wherein there is a plurality of said discrete elements serially arranged with aligned stem portions.

4. The system of claim 1, wherein said means for applying said drive field includes means for generating a predetermined sequence of discrete pulsed drive field orientations aligned respectively with said stem portion and said angled arms such that attracting magnetic poles are formed consecutively along said stem portion.

5. The system of claim 4, wherein consecutive ones of said drive field orientations are separated by approximately 120°, and said stem portion and angled arms are similarly oriented with respect to each other.

6. A field-accessed bubble propagation system, comprising a sheet of magnetic bubble material, means for producing and maintaining bubbles therein, a ferromagnetic overlay circuit operatively disposed on said sheet including a closed bubble path formed by a plurality of serially arranged discrete circuit elements, said closed path being in the form of a polygon having sides parallel to corresponding sides of a reference triangle, each of said discrete elements composing each side having an aligned stem portion parallel to said corresponding side of said reference triangle, an end arm projecting at an acute angle from one end of said stem portion parallel to another side of said triangle and an intermediate arm projecting at an acute angle from the middle of said stem portion on the other side thereof parallel to the remaining side of said triangle, and means for applying a sequence of discrete pulsed drive field orientations in the plane of said sheet realigning consecutively with the sides of said reference triangle to propagate bubbles around said closed path.

7. The system of claim 6, wherein at least some of the sides of said polygonal path form a zigzag pattern with alternately oriented segments composed of said discrete elements.

8. The system of claim 6 wherein the junction of two sides of said closed path is formed by a cornering element which is a composite of two adjacent ones of said discrete elements.

9. The system of claim 8 wherein said cornering element includes a common segment which serves as the stem portion of one of said two discrete elements and as the end arm of the other.

10. A field-accessed mutually exclusive bubble propagation system, comprising a sheet of magnetic bubble material, means for producing and maintaining bubbles therein, a ferromagnetic overlay pattern operatively disposed on said sheet including two closed loop bubble paths formed by serially arranged discrete circuit elements, and means for applying a sequence of first pulsed drive field orientations in the plane of said sheet for propagating bubbles around one of said closed paths and for applying a sequence of second pulsed drive field orientations in the plane of said sheet for propagating bubbles around said other closed path exclusively.

11. The system of claim 10, wherein each said path is in the form of a polygon, each side of said polygon including a plurality of said serially arranged circuit elements.

12. The system of claim 11, wherein the elements of said one path are reversed with respect to the corresponding elements of said other path along the local direction of propagation.

13. A field-accessed bubble propagation system, comprising a sheet of magnetic bubble material, means for producing and maintaining magnetic bubbles therein, a ferromagnetic overlay circuit operatively disposed on said sheet including two propagation paths composed of serially arranged unsymmetrical discrete circuit elements, the elements forming one path being reversed along the direction of propagation with respect to the elements forming the other path, and means for applying sequences of first and second discrete pulsed field orientations in the plane of said sheet to propagate bubbles exclusively on said one path and said other path respectively.

14. The system of claim 13, wherein said elements are composed of a plurality of straight portions making acute angles with each other.

15. The system of claim 13, wherein said elements include three differently oriented straight portions.

16. The system of claim 13, wherein elements in one of said two paths bear the same geometrical relationship to said first pulsed field orientations as elements in said other path bear to said second pulsed field orientations.

17. The system of claim 13, wherein said first orientations are opposite to corresponding ones of said second orientations.

18. The system of claim 13, wherein said first orientations and said second orientations are each composed of consecutive orientations separated by approximately 120°, said second orientations being of complementary polarity to said first orientations.

19. A field-accessed bubble propagation system, comprising a sheet of magnetic bubble material, means for producing and maintaining bubbles therein, a ferromagnetic overlay circuit operatively disposed on said sheet including two propagation paths composed of discrete circuit elements, the elements in one path being symmetrical in shape to the elements in the other path, means for generating first and second sets of discrete drive field orientations in the plane of said sheet, the membership of said first and second sets being different, the elements in either one of said paths being responsive to only a corresponding one of said first and second sets for propagating bubbles on the respective path, whereby propagation on one path is mutually exclusive from propagation on the other path.

20. The system of claim 19, wherein elements in one of said two paths bear the same geometrical relationship to said first set of drive field orientations as elements in said other path bear to said second set of orientations.

21. The system of claim 19, wherein all of the orientations in said first set are different from the orientations in said second set.

22. The system of claim 21, wherein at least one of the orientations in said first set is opposite from one of the orientations in said second set.

23. The system of claim 22, wherein all of the orientations in said first set are opposite from the corresponding orientations in said second set.

24. A field-accessed mutually exclusive magnetic bubble propagation system, comprising means having discrete circuit elements defining two bubble propagation paths, said circuit elements in said respective paths being different, and means for generating first and second sets of drive field orientations, the membership of said first and second sets being different, the elements in either one of said paths being responsive to only a corresponding one of said first and second sets for propagating bubbles on the respective path, propagation on one path being mutually exclusive from propagation on the other path.

25. The system of claim 24, wherein at least one of said paths forms a closed loop.

26. A field-accessed mutually exclusive magnetic bubble propagation system, comprising means having discrete circuit elements defining a first path for propagating bubbles alternatively in forward and reverse directions, means having discrete elements defining a second path for propagating bubbles alternatively in forward and reverse directions, and means for generating first and second sets of magnetic drive field orientations, the membership of said first and second sets being different, the elements in either one of said paths being responsive only to a corresponding one of said first and second sets for propagating bubbles on the respective path, propagation in either direction on one path being mutually exclusive from propagation in either direction on the other path.

27. The system of claim 26, wherein at least one of said paths forms a closed loop.

28. A field-accessed mutually exclusive magnetic bubble propagation system, comprising means having discrete circuit elements defining two bubble propagation paths, individual ones of said circuit elements extending along more than one axis, and means for generating first and second sets of drive field orientations, the membership of said first and second sets being different, the elements in either one of said paths being responsive to only a corresponding one of said first and second sets for propagating bubbles on the respective paths, propagation on one path being mutually exclusive from propagation on the other path.

29. The system of claim 28, wherein one of said paths forms a closed loop.

30. A mutually exclusive magnetic bubble propagation system, comprising means having discrete circuit elements defining two bubble propagation paths, and means for generating first and second sets of drive field orientations, the membership of said first and second sets being different, each of said sets including drive field orientations along more than one axis, the elements in either one of said paths being responsive to only a corresponding one of said first and second sets for propagating bubbles on the respective paths, propagation on one path being mutually exclusive from propagation on the other path.

31. The system of claim 30, wherein one of said paths forms a closed loop.

* * * * *